March 3, 1942. A. W. DODGE 2,275,010
GLASS TANK
Filed Jan. 15, 1940
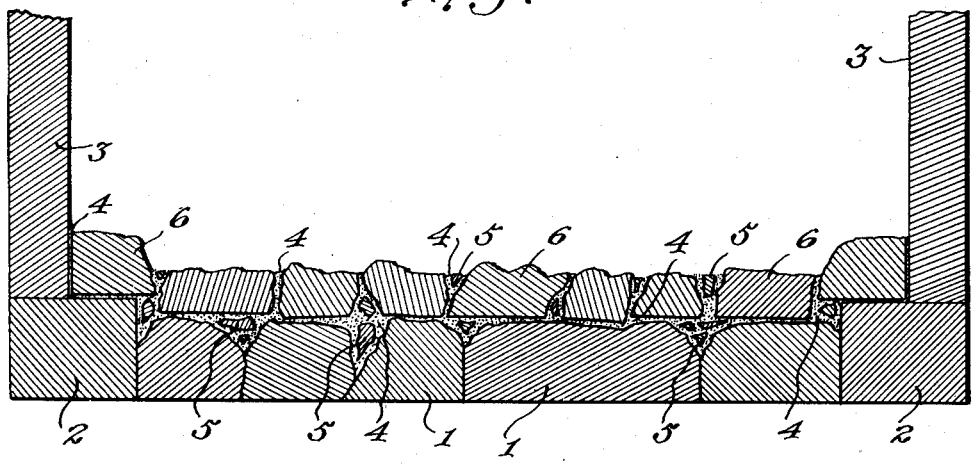
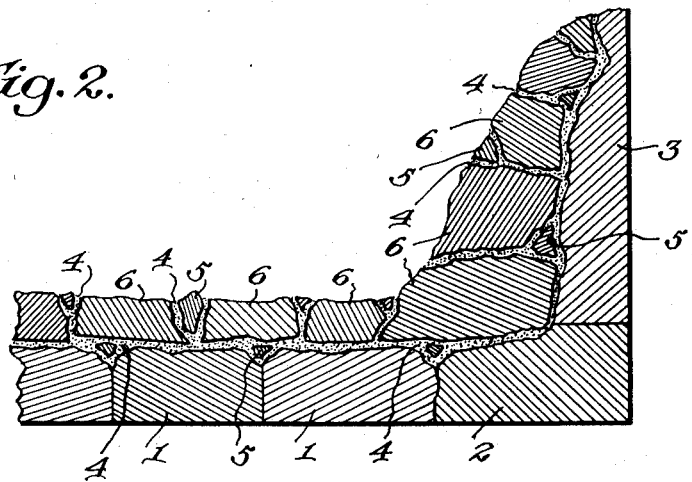
Inventor
Alfred W. Dodge
By Ecclesto + Ecclesto
Attorneys Patented Mar. 3, 1942

2,275,010

UNITED STATES PATENT OFFICE 2,275,010

GLASS TANK

Alfred W. Dodge, Zanesville, Ohio, assignor to Hazel-Atlas Glass Company, Wheeling, W. Va., a corporation of West Virginia Application January 15, 1940, Serial No. 313,957

9 Claims. (Cl. 49—54)

While some progress has been made in the insulation of glass tanks, yet the heat losses are still immense and very costly. Another heavy cost in the production of glass results from the relatively short life of glass tanks, which are very expensive.

One of the objects of the present invention is to reduce the consumption of fuel in the operation of glass melting tanks, by means of improved insulation.

Another object of the invention is to provide an improved tank construction which greatly extends the life of the tanks, and thereby further reduces the cost of the glass produced.

A further object of the invention is to provide a tank construction in which used heavier than glass blocks may be efficiently employed in either new tanks or in the repair of old tanks.

Various other objects and advantages of the invention will be apparent to those skilled in the art, from the following detailed description, when taken in connection with the accompanying drawing, in which, Figure 1 is a vertical, transverse, sectional view of the lower portion of a continuous glass melting tank, illustrating the invention as applied to the floor or bottom of the tank; and Figure 2 is a similar but fragmentary view, illustrating the invention as applied to the tank bottom and side walls.

The general construction of glass melting tanks is so well known that it is needless to illustrate a complete tank, and further, the present invention relates mainly to the tank bottom and side walls.

Also, the invention is applicable to the repair of used tanks as well as to the construction of new tanks, and for purposes of illustration I have shown repaired tanks, ready for heating.

Referring now to the drawing, and particularly to Figure 1, numeral 1 indicates flux blocks forming the lowermost layer of the tank bottom or floor. These flux blocks, which are well known, are a dense refractory made from clay and grog, and are lighter than glass. Numeral 2 refers to a new flux bottom rim, and numeral 3 refers to the heavier than glass wall blocks.

As previously stated, the drawing illustrates tanks which have just been repaired, and the bottom flux blocks 1 are partly eroded from previous use in the tank. The enlarged or eroded joints between these blocks are first cleared of all glass which may have formed therein, and these spaces are then filled with a heavier than glass grog bonded with deflocculated clay, and referred to by numeral 4. This heavier than glass mortar may be what is commercially known as electroplast. Set in the grog in these spaces are small pieces 5 of heavier than glass blocks, which may be what is commercially known as Corhart. It is to be noted that the grog is put in place moist, so that it will form a ceramic bond with the heavier than glass block fragments 5, when subsequently heated.

The flux blocks 1 constitute the insulation for the tank bottom lining which will now be described.

A layer of the moist heavier than glass grog or mortar 4, such as electroplast, is spread over the flux blocks, and then a layer of heavier than glass blocks 6, such as "Corhart," is placed in position. These heavier than glass blocks 6 may be new, or they may be previously used blocks and partly eroded, as shown. Used blocks are preferably employed, for in accordance with the present invention they produce substantially as good results as new blocks, as will appear hereinafter, and of course the employment of used blocks provides a very great saving.

The interstices between the heavier than glass blocks 6 are filled with the moist heavier than glass grog or mortar 4, and set therein, particularly in the larger interstices, are fragments 5 of heavier than glass blocks, such as "Corhart."

The tank bottom having been laid as above described, the tank is then heated prior to starting the glass melting operation. On firing the empty tank or furnace to operating temperature a ceramic bond is developed. In this way all of the heavier than glass material, i. e., the blocks 6, the grog or mortar 4, and the block fragments 5, become monolithic. When the tank is operated this monolithic heavier than glass layer, which is the real lining of the tank, prevents the molten glass from penetrating beneath it and destroying it by upward eating. And of course the flux blocks serve to insulate the heavier than glass lining.

It is to be particularly noted that as the heavier than glass blocks 6, the heavier than glass block fragments 5, and the heavier than glass grog or mortar 4, become a monolithic layer, it makes little difference whether the blocks are new or have been previously used. This of course results in a great saving, either in the construction of new tanks or in the repair of old tanks.

It will also be noted that the insulation of the heavier than glass lining by the flux blocks, reduces heat losses, and thereby reduces the fuel expense. And further, as the heavier than glass lining is monolithic it is impossible for the molten glass in the tank to work below the lining and destroy it by eating upward. Thus the tank life is greatly extended, with respect to both the new tank and the old tank when repaired.

Figure 2 illustrates the invention applied to the tank bottom and walls, and all that has been said heretofore in connection with the tank bottom applies equally well to the tank walls. The heavier than glass wall blocks 3, such as "Corhart," have been partly eroded, and they are lined up to or above the metal line, with old or new heavier than glass blocks, fragments of heavier than glass blocks and heavier than glass grog or mortar, just as described in connection with Figure 1. Of course the wall blocks 3 may be new or partly eroded. It will also be understood that the invention may be applied to the tank bottom only, or to the tank walls only, or to the tank bottom and walls, or to any other parts of glass tanks which are subjected to the action of the molten glass.

Having fully described the invention, what I claim is:

1. A repaired glass melting tank comprising a tank bottom formed of partly eroded flux blocks, a heavier than glass grog in the eroded joints, and fragments of heavier than glass blocks embedded in the grog.

2. A repaired glass melting tank comprising a tank bottom formed of flux blocks, a layer of used heavier than glass blocks positioned over the flux blocks, a heavier than glass grog in the spaces between the used heavier than glass blocks, and fragments of heavier than glass blocks embedded in the grog.

3. A glass melting tank comprising a tank bottom formed of flux blocks, a layer of heavier than glass blocks positioned over the flux blocks, a heavier than glass grog in the spaces between the heavier than glass blocks, and fragments of heavier than glass blocks embedded in the grog.

4. A repaired glass melting tank comprising a tank bottom formed of partly eroded flux blocks, a heavier than glass grog in the eroded joints and covering the blocks, fragments of heavier than glass blocks set in the grog, and a layer of heavier than glass blocks positioned over the flux blocks.

5. A repaired glass melting tank comprising a tank bottom formed of partly eroded flux blocks, a heavier than glass grog in the eroded joints and covering the blocks, fragments of heavier than glass blocks set in the grog, a layer of used heavier than glass blocks positioned over the flux blocks, a heavier than glass grog in the spaces between the used heavier than glass blocks, and fragments of heavier than glass blocks embedded in the grog.

6. A glass melting tank comprising a tank bottom formed of flux blocks and a monolithic tank lining above the flux blocks, said monolithic lining comprising heavier than glass blocks, heavier than glass grog, and fragments of heavier than glass blocks embedded in the grog.

7. A repaired glass melting tank having a portion formed of partly eroded flux blocks, a heavier than glass grog in the eroded joints, and fragments of heavier than glass blocks embedded in the grog.

8. A repaired glass melting tank having a portion formed of flux blocks, a layer of used heavier than glass blocks arranged over the flux blocks, a heavier than glass grog in the spaces between the used heavier than glass blocks, and fragments of heavier than glass blocks embedded in the grog.

9. A glass melting tank having a portion formed of a monolithic structure comprising heavier than glass blocks, heavier than glass grog, and fragments of heavier than glass blocks embedded in the grog.

ALFRED W. DODGE.